United States Patent [19]

Kresta

[11] 4,067,830

[45] Jan. 10, 1978

[54] CATALYTIC TRIMERIZATION OF POLYISOCYANATES

[75] Inventor: Jiri E. Kresta, Detroit, Mich.

[73] Assignee: Ashland Oil, Inc., Ashland, Ky.

[21] Appl. No.: 671,562

[22] Filed: Mar. 29, 1976

[51] Int. Cl.² ............................................. C08G 18/18
[52] U.S. Cl. ...................... 260/2.5 AW; 260/2.5 AB; 260/2.5 AC; 260/75 NB; 260/75 NC; 260/77.5 AB; 260/77.5 AC; 260/77.5 NC
[58] Field of Search ................. 260/2.5 AC, 2.5 AW, 260/77.5 AC, 75 NC, 77.5 NC, 2.5 AB, 77.5 AB, 75 NB

[56] References Cited

U.S. PATENT DOCUMENTS

| | | | |
|---|---|---|---|
| 3,485,806 | 12/1969 | Bloomquist et al. | 526/51 |
| 3,723,364 | 3/1973 | McLaughlin et al. | 260/2.5 AW |
| 3,745,133 | 7/1973 | Communale et al. | 260/2.5 AW |
| 3,925,284 | 12/1975 | Carleton et al. | 260/2.5 AW |

*Primary Examiner*—Eugene C. Rzucidlo
*Attorney, Agent, or Firm*—William Kammerer

[57] ABSTRACT

Compounds (aminimides) of the class wherein a negatively charged nitrogen atom of an acylamide is directly bonded to a cationic nitrogen atom having one hydroxyethyl and two methyl substituents represent uniquely effective catalysts for the trimerization of the isocyanate radical. These aminimides are especially useful as catalysts for the preparation of rigid polyisocyanate-polyisocyanurate foams.

9 Claims, No Drawings

CATALYTIC TRIMERIZATION OF POLYISOCYANATES

BACKGROUND OF THE INVENTION

1. Field of the Invention

This invention relates to a method for effecting the reaction of a polyhydric compound and a polyisocyanate to provide polymers comprised of urethane and isocyanurate linkages.

2. Description of the Prior Art

Rigid foams of a cured polymer comprised of urethane and isocyanurate linkages are known in the art for having excellent insulating and structural integrity properties in addition to exhibiting a high degree of fire retardancy. Polyurethane foams per se, while having excellent physical strength properties, are nonetheless sorely deficient in fire retardancy. Polyisocyanurate foams, on the other hand, are relatively non-combustible but untolerably friable for most uses. Combining the two types of polymeric structures in one polymer, however, compensates for the indicated deficiency associated with the respective structures in rigid foam applications.

While as indicated, polyurethane-polyisocyanurate foams are known, they have heretofore been comparatively difficult to prepare. The problem stems from the fact that two different reactions are involved in preparing said foam; namely, urethane formation and the trimerization of isocyanate groups to provide the isocyanurate configuration. Urethane formation is rapidly accomplished in the presence of a suitable catalyst, a host of which are known to serve effectively for this purpose. The trimerization reaction, however, is far more difficult to achieve especially in the time strictures imposed in carrying out the various foaming operations. Although the trimerization reaction can be catalytically induced, there are comparatively few catalysts applicable for this purpose and those that do promote the reaction are required to be used in combination with a conventional urethane catalyst. Accordingly, there is a need for a catalyst which will serve to effect both of the indicated types of catalysis and also exhibit substantially more effectiveness for inducing trimerization than the known catalysts hitherto available for this purpose.

SUMMARY OF THE INVENTION

The present invention is broadly directed to a method for catalyzing the reaction of a polyol with an equivalent excess of a polyisocyanate to result in the formation of a polymer comprised of urethane and isocyanurate linkages. The catalysts singularly effective for achieving this type of polymeric structure correspond to the following formula:

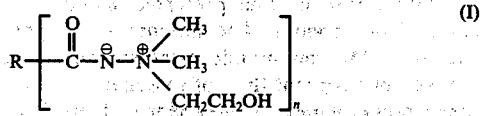

wherein $n$ is the integer 1 or 2; R is $C_2$-$C_8$ alkylene when $n$ is 2; and R is $C_1$-$C_{18}$ alkyl, methoxymethylene or phenyl when $n$ is 1.

Since the foregoing catalysts serve as such for the indicated urethane reaction as well as for a comparative rapid inducement of the trimerization reaction, the implementation of the invention for preparation of rigid fire retardant polyisocyanate-polyisocyanurate foams represents the preferred aspect thereof.

DESCRIPTION OF THE PREFERRED EMBODIMENTS

Before discussing the preferred embodiments of the invention; that is, the preparation of polyurethane-polyisocyanurate foams in the presence of representative catalysts corresponding to Formula I above, a preliminary insight will be given as to the effectiveness of these catalysts in trimerizing the isocyanate radical. The aminimide catalysts illustrated herein in connection with both of the foregoing aspects correspond to the following structural formulas:

I(A) - Bis(dimethylethanolamine) azelaylimide

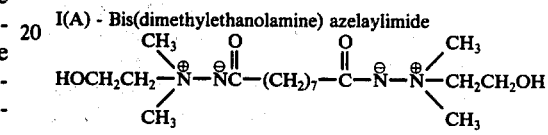

I(B) - Dimethylethanolamine acetylimide

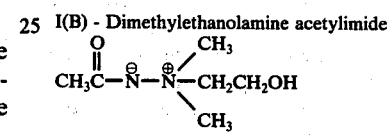

I(C) - Dimethylethanolamine propionylimide

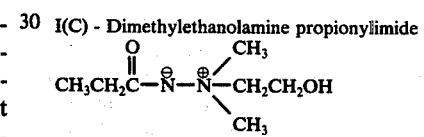

I(D) - Dimethylethanolamine methoxyacetylimide

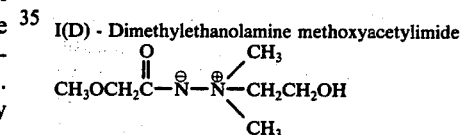

The above aminimides can be readily prepared by reacting essentially molecular amounts of unsymmetrical dimethyl hydrazine, ethylene oxide, and a lower alkyl ester of the applicable mono- or dicarboxylic acid. Complete details with respect to this procedure can be found in U.S. Pat. No. 3,485,806.

For the purpose of demonstrating the catalytic activity of the above aminimides in trimerizing phenyl isocyanate, an apparatus was assembled from a 300 ml 3-neck flask, a condenser and a magnetic stirrer. The flask was kept in a constant temperature bath at 40° C. under dry nitrogen. Approximately a 2.5 molal solution of phenyl isocyanate in acetonitrile was prepared and 100 ml of this solution was pipetted into the aforementioned flask. The initial isocyanate content was determined by a standard analytical method. The test catalyst was first dissolved in acetonitrile and then introduced into the reaction solution whereupon the initial concentration of the phenyl isocyanate solution was determined and the isocyanate concentration corrected for the amount of catalyst solution added to the reaction mixture. Samples of about 3 grams were taken at regular intervals and the isocyanate concentration was determined by the titration method mentioned above. Further particulars with regard to these tests and the results obtained are outlined in the following Table I.

TABLE I

| TRIMERIZATION OF PHENYL ISOCYANATE IN ACETONITRILE | | | | | | | | |
|---|---|---|---|---|---|---|---|---|
| Catalyst | I(A) | | I(B) | | I(C) | | I(D) | |
| Ph NCO, M | 2.234 | | 2.684 | | 2.600 | | 2.600 | |
| Wt. % Cat.* | 5 | | 5 | | 5 | | 5 | |
| Time (Min.) | NCO % | CONV. % | NCO % | CONV. % | NCO % | CONV. % | NCO % | CONV.% |
| 0 | | 0.00 | | 0.00 | | 0.00 | | 0.00 |
| 1 | 6.99 | 25.54 | — | — | 6.89 | 48.62 | 3.53 | 75.88 |
| 2 | — | — | 0.00 | 100.00 | 0.08 | 99.43 | 0.82 | 94.40 |
| 3 | — | — | | | 0.00 | 100.00 | 0.00 | 100.00 |
| 5 | 0.00 | 100.00 | | | | | | |

*based on initial amount of Ph NCO

Notwithstanding that the preferred aspect of the invention concerns the preparation of rigid polyurethane-polyisocyanurate foams, the usefulness of the invention is clearly not confined thereto. For example, resilient foams as well as surface coating and molding compositions can be similarly catalyzed during the curing stage so as to provide a resultant product containing isocyanurate linkages leading to an enhancement of thermal stability and other properties. Likewise, monomeric polyisocyanates, such as for example, toluene diisocyanate, can be advantageously converted to a polymeric type polyisocyanate containing isocyanurate linkages. These polyisocyanates can in turn be utilized in preparing polyurethanes in the same fashion as monomeric and polymeric type polyisocyanates are conventionally employed for this purpose.

In order to illustrate the preparation of rigid polyurethane-polyisocyanurate foams in accordance with this invention a series of such foams was made employing a standard type of formulation composed of commercially available components. The latter included a polymeric isocyanate (PAPI 105 - Upjohn), a polyethylene glycol (Carbowax 400 - Union Carbide), an organosilicone surfactant (DC-193-Dow Corning) and trichlorofluoromethane. As indicated, one basic type of formulation was employed and varied only with respect to its isocyanate index. The isocyanate index refers to the value obtained by dividing the number of equivalents of NCO in the reaction mixture by the number of equivalents of OH and multiplying by 100. The test aminimide catalysts were first dissolved in dipropylene glycol by heating to 70° C. In preparing the foams, the one-shot technique was observed involving mixing the components in the following order: polyol, catalyst solution in dipropylene glycol, surfactant, trichlorofluoromethane, and the polymeric isocyanate. After stirring, the reaction mixture was poured into a 9×5×4 inch cake box. The temperature profile was measured by a thermometer with the bulb portion located at the center of the box. The rise of the foam was measured by determining the height of the foam with respect to time.

The foams were cured for 24 hours at 100° C. and then allowed to age for at least one week at room temperature prior to further testing. The evaluation tests conducted were for friability, Oxygen Index, and compressive strength. The friability was evaluated in accordance with ASTM-C-421-61; the Oxygen Index was determined in accordance with ASTM-D-2863-70; and the compressive strength was measured in accordance with ASTM-D-1621-64. Details as to the various formulations tested wherein the indicated component parts are listed as parts by weight are set forth in the following Table II. Foaming properties as well as the results obtained for the evaluation tests are likewise given in this table.

TABLE II

| CATALYST | IA | IA | IB | IB |
|---|---|---|---|---|
| ISOCYANATE INDEX | 400 | 600 | 400 | 600 |
| FORMULATION: | | | | |
| POLYOL(1)CARBOWAX-400 | 46.7 | 46.5 | 38.5 | 30.5 |
| (2)DPG | 1.5 | 3.0 | 5.0 | 9.5 |
| CATALYST | 6.0 | 12.0 | 5.0 | 9.5 |
| SURFACTANT-DC 193 | 2.0 | 2.0 | 1.0 | 2.0 |
| FREON 11B (Dupont) | 25.5 | 30.0 | 22.5 | 26.5 |
| PAPI 105 | 150.9 | 247.9 | 160.4 | 263.6 |
| CREAM TIME | 10″ | 11″ | 14″ | 12″ |
| RISE TIME | 2′6″ | 2′41″ | 2′23″ | 2′28″ |
| TACK FREE TIME | 2′50″ | 4′21″ | 3′15″ | 3′01″ |
| PHYSICAL PROPERTIES: | | | | |
| DENSITY, pcf | 1.93 | 2.18 | 2.10 | 2.09 |
| FRIABILITY, % | 13.1 | 30.2 | 13.9 | 39.9 |
| OXYGEN INDEX | 26.5 | 31.75 | 26.5 | 28.5 |
| COMPRESS. STRENGTH-psi | | | | |
| PARALLEL TO RISE | 15.0 | 21.9 | 23.8 | 23.4 |
| PERP. TO RISE | 11.25 | 19.0 | 20.0 | 20.5 |

As is evident from the data set forth in Table I, the amount of aminimide for catalyzing the trimerization reaction in the illustrated one-shot foaming technique for preparing rigid foams is dependent upon the intrinsic activity of the aminimide compound employed and the isocyanate index. In general, intrinsic activity of any given compound depends upon the weight relationship the aminimide moiety bears to the molecular weight of the compound since the former is the actual catalysis promoting portion thereof. Another important consideration concerns the specific foaming application contemplated inasmuch as the various applications require different reaction profiles. However, the illustrative examples presented above will amply serve to guide those skilled in the art with respect to the proper selection of the amount of catalyst suitable for the purpose at hand.

In connection with the above, it has been fortuitously discovered that the activity of the aminimide catalysts of this invention for inducing trimerization can be markedly enchanced by using same in combination with a co-catalyst or promoter in the form of an alkali metal salt of a monocarboxylic acid. While all of the fatty acids are applicable for this purpose, as well as aromatic acids, e.g., benzoic, naphthoic, etc., the preferred acid is 2-ethyl hexanoic. The preferred metal, on the other hand, is potassium. The amount of the promoter in relation to the aminimide catalyst varies broadly from one weight percent thereof to equal parts with the preferred range being in the order of from 10 to 20 parts per 100 parts of the aminimide. Not only does the presence of a promoter permit the use of substantially less aminimide in achieving a high degree of trimerization, significant improvements in physical properties of the resultant foams are realized as borne out by the data given in the following Table III describing characteristics of a series of rigid foams prepared in the same manner as outlined above.

TABLE III

| ISOCYANATE INDEX | 400 | 400 | 600 | 600 |
|---|---|---|---|---|
| FORMULATION: | | | | |
| POLYOL(1)CARBOWAX-400 | 38.5 | 38.5 | 30.5 | 30.5 |
| (2)DPG | 2.0 | 1.0 | 5.0 | 3.5 |
| CATALYST(1)I(B) | 2.0 | 1.0 | 5.0 | 3.5 |
| (2)K octoate | 0.31 | 0.31 | 0.25 | 0.4 |
| SURFACTANT-DC 193 | 1.0 | 1.0 | 2.0 | 2.0 |
| FREON 11B | 23.5 | 23.5 | 28.0 | 29.0 |
| PAPI 105 | 133.1 | 124.1 | 204.4 | 189.1 |
| CREAM TIME | 10" | 11" | 10" | 8" |
| RISE TIME | 1'34" | 2'05" | 2'0" | 2'0" |
| TACK FREE TIME | 2'13" | 3'25" | 3'10" | 2'13" |
| PHYSICAL PROPERTIES: | | | | |
| DENSITY - pcf | 1.97 | 1.87 | 2.02 | 2.06 |
| FRIABILITY - % | 12.4 | 13.1 | 27.8 | 29.6 |
| OXYGEN INDEX | 26.3 | 26.5 | 29.75 | 31.25 |
| COMPRESS. STRENGTH - psi | | | | |
| PARALLEL TO RISE | 40.0 | 34.5 | 37.5 | 40.5 |
| PERP. TO RISE | 25.0 | 24.0 | 26.5 | 23 |

What is claimed is:

1. In a process for preparing rigid polyisocyanurate-polyurethane foam by the catalyzed reaction of a polyol with an excess of polyisocyanate; the improvement of effecting said reaction in the presence of a catalytic amount of an aminimide having the formula:

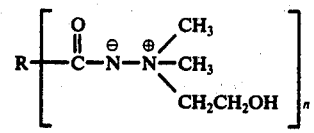

wherein $n$ is the integer 1 or 2; R is $C_2$–$C_8$ alkylene when $n$ is 2; and R is $C_1$–$C_{18}$ alkyl, methoxymethylene or phenyl when $n$ is 1.

2. The improvement in accordance with claim 1 wherein said aminimide is bis(dimethylethanolamine) azelaylimide.

3. The improvement in accordance with claim 1 wherein said aminimide is dimethylethanolamine acetylimide.

4. The improvement in accordance with claim 1 wherein said aminimide is dimethylethanolamine propionylimide.

5. The improvement in accordance with claim 1 wherein said aminimide is dimethylethanolamine methoxyacetylimide.

6. The improvement in accordance with claim 1 wherein said aminimide is dimethylethanolamine benzimide.

7. The improvement in accordance with claim 1 wherein said aminimide is employed in conjunction with an alkali metal salt of a mono-carboxylic acid on the basis of 1-100 parts by weight thereof per 100 parts by weight of the aminimide.

8. The improvement in accordance with claim 7 wherein said alkali metal is potassium.

9. The improvement in accordance with claim 8 wherein said monocarboxylic acid is 2-ethylhexanoic acid.

* * * * *